US011775615B2

(12) United States Patent
Chiu et al.

(10) Patent No.: US 11,775,615 B2
(45) Date of Patent: Oct. 3, 2023

(54) SYSTEM AND METHOD FOR TRACKING DETECTED OBJECTS

(71) Applicant: Toyota Research Institute, Inc., Los Altos, CA (US)

(72) Inventors: Hsu-kuang Chiu, Mountain View, CA (US); Jie Li, Los Altos, CA (US); Rares A. Ambrus, San Francisco, CA (US); Christin Jeannette Bohg, Palo Alto, CA (US)

(73) Assignees: Toyota Research Institute, Inc., Stanford (CA); The Board of Trustees of the Leland Stanford Junior University, Stanford, CA (US)

( * ) Notice: Subject to any disclaimer, the term of this patent is extended or adjusted under 35 U.S.C. 154(b) by 342 days.

(21) Appl. No.: 17/242,498

(22) Filed: Apr. 28, 2021

(65) Prior Publication Data

US 2022/0180117 A1    Jun. 9, 2022

Related U.S. Application Data

(60) Provisional application No. 63/121,307, filed on Dec. 4, 2020.

(51) Int. Cl.
*G06K 9/00* (2022.01)
*G06F 18/22* (2023.01)
(Continued)

(52) U.S. Cl.
CPC ............ *G06F 18/22* (2023.01); *G06F 18/213* (2023.01); *G06F 18/25* (2023.01); *G06N 3/08* (2013.01); *G06V 20/64* (2022.01)

(58) Field of Classification Search
CPC ........ G06F 18/22; G06F 18/213; G06F 18/25; G06N 3/08; G06N 3/045; G06V 20/64;
(Continued)

(56) References Cited

U.S. PATENT DOCUMENTS 8,073,197 B2 * 12/2011 Xu .......................... G06T 7/215
348/169
2019/0005655 A1 * 1/2019 Lim ........................ G06T 7/74
(Continued)

OTHER PUBLICATIONS

Chiu et al., "Probabilistic 3D Multi-Object Tracking for Autonomous Driving," 8 pages, arXiv:2001.05673v1 [cs.CV] Jan. 16, 2020.
(Continued)

*Primary Examiner* — Dhaval V Patel
(74) *Attorney, Agent, or Firm* — Christopher G. Darrow; DARROW MUSTAFA PC

(57) ABSTRACT

Systems and methods for tracking objects are disclosed herein. In one embodiment, a system having a processor merges features of detected objects extracted from a point cloud and a corresponding image to generate fused features for the detected objects, generates a learned distance metric for the detected objects using the fused features, determines matched detected objects and unmatched detected objects, applies prior tracking identifiers of the detected objects at the prior time to the matched detected objects, determines a confidence score for the fused features of the unmatched detected objects, and applies new tracking identifiers to the unmatched detected objects based on the confidence score.

20 Claims, 7 Drawing Sheets

(51) Int. Cl.
*G06N 3/08* (2023.01)
*G06V 20/64* (2022.01)
*G06F 18/25* (2023.01)
*G06F 18/213* (2023.01)

(58) Field of Classification Search
CPC .... G06V 10/454; G06V 10/806; G06V 10/82; G06V 20/58; G06T 7/277; G06T 2207/10024; G06T 2207/10028; G06T 2207/10048; G06T 2207/20084; G06T 2207/30252; G06T 7/246
See application file for complete search history.

(56) References Cited

U.S. PATENT DOCUMENTS

| | | | |
|---|---|---|---|
| 2020/0090359 A1* | 3/2020 | Pillai | G06V 10/82 |
| 2020/0160559 A1* | 5/2020 | Urtasun | G06T 7/75 |
| 2022/0092296 A1* | 3/2022 | Zhao | G06F 18/22 |

OTHER PUBLICATIONS

Liang et al., "PnPNet: End-to-End Perception and Prediction with Tracking in the Loop," Proceedings of the IEEE/CVF Conference on Computer Vision and Pattern Recognition (CVPR), pp. 11553-11562 (2020).

Yin et al., "Center-based 3D Object Detection and Tracking," 11 pages, arXiv:2006.11275v1 [cs.CV] Jun. 19, 2020.

Weng et al., "GNN3DMOT: Graph Neural Network for 3D Multi-Object Tracking with Multi-Feature Learning," 10 pages, arXiv:2006.07327v1 [cs.CV] Jun. 12, 2020.

Weng et al., "A Baseline for 3D Multi-Object Tracking," 10 pages, arXiv:1907.03961v1 [cs.CV] Jul. 9, 2019.

Mahalanobis, "On the generalized distance in statistics," Proceedings of the National Institute of Sciences of India, 8 pages, 1936.

* cited by examiner

SYSTEM AND METHOD FOR TRACKING DETECTED OBJECTS

CROSS-REFERENCE TO RELATED APPLICATION

This application claims the benefit of U.S. Provisional Patent Application No. 63/121,307, entitled "PROBABILISTIC 3D MULTI-MODAL, MULTI-OBJECT TRACKING FOR AUTONOMOUS DRIVING," filed Dec. 4, 2020, which is incorporated by reference herein in its entirety.

TECHNICAL FIELD

The subject matter described herein relates, in general, to systems and methods for tracking detected objects.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some current vehicles have systems capable of detecting objects external to the vehicle, such as other vehicles, pedestrians, buildings, trees, and the like. Some objects, such as vehicles and pedestrians, are dynamic and are capable of movement. Other objects, such as buildings and trees, are static and are not capable of movement. Regarding dynamic objects, the tracking of the movement of the dynamic objects is important for downstream tasks, such as motion planning systems that plan the motion of the vehicle based on the position and predicted movements of objects.

One aspect of tracking algorithms is the ability to match currently detected objects with previously detected objects. More simply, objects detected in the present can either be newly detected objects that were never detected before or previously detected. Newly detected objects need to be tracked separately from previously detected objects. Previously detected objects detected should be associated with detections that occurred in the past.

To achieve this data association, some multi-object tracking algorithms adopt the tracking-by-detection framework. These systems take 3D object detection results as input to the tracking methods. In the data association step, different distance metrics are used to find the matched track-detection pairs. For example, some systems utilize a 3D intersection-over-union as an extension to the 2D intersection-over-union in the 2D tracking algorithm. Other multi-object tracking algorithms combine the trajectory of a detected object with object geometric and appearance features to find the matched track-detection pairs.

SUMMARY

This section generally summarizes the disclosure and is not a comprehensive explanation of its full scope or all its features.

In one embodiment, a system for tracking detected objects includes a processor and a memory in communication with the processor. The memory may include a feature fusion module, a distance combination module, a matching module, and a track initialization module. The feature fusion module includes instructions that, when executed by the processor, cause the processor to merge features of detected objects extracted from a point cloud and a corresponding image to generate fused features for the detected objects.

The distance combination module includes instructions that, when executed by the processor, cause the processor to generate a learned distance metric for the detected objects using the fused features at a current time, fused features at a prior time, and Mahalanobis distances. The Mahalanobis distances may indicate distances between positions, orientations, and scales of detected objects at the current time and predicted positions, orientations, and scales of the detected objects determined at the prior time.

The matching module includes instructions that, when executed by the processor, cause the processor to determine matched detected objects and unmatched detected objects. The matched detected objects are detected objects at the current time that have been matched with detected objects at the prior time based on the learned distance metric, while the unmatched detected objects are detected objects that have no matches based on the learned distance metric. The matching module includes instructions that, when executed by the processor, cause the processor to apply prior tracking identifiers of the detected objects at the prior time to the matched detected objects.

With regards to the unmatched detected objects, the track initialization module includes instructions that, when executed by the processor, cause the processor to determine a confidence score for the fused features of the unmatched detected objects and apply new tracking identifiers to the unmatched detected objects based on the confidence score.

In another embodiment, a method for tracking detected objects may include the steps of merging features of detected objects extracted from a point cloud and a corresponding image to generate fused features for the detected objects and generating a learned distance metric for the detected objects using the fused features at a current time, fused features at a prior time, and Mahalanobis distances. The Mahalanobis distances may indicate distances between positions, orientations, and scales of detected objects at the current time and predicted positions, orientations, and scales of the detected objects determined at the prior time.

The method further includes determining matched detected objects and unmatched detected objects and applying prior tracking identifiers of the detected objects at the prior time to the matched detected objects. For unmatched detected objects, the method may further include the steps of determining a confidence score for the fused features of the unmatched detected objects and applying new tracking identifiers to the unmatched detected objects based on the confidence score.

In yet another embodiment, a non-transitory computer-readable medium having instructions that, when executed by a processor, cause the processor to merge features of detected objects extracted from a point cloud and a corresponding image to generate fused features for the detected objects and generate a learned distance metric for the detected objects using the fused features at a current time, fused features at a prior time, and Mahalanobis distances. Like before, the Mahalanobis distances may indicate distances between positions, orientations, and scales of detected objects at the current time and predicted positions, orientations, and scales of the detected objects determined at the prior time.

The non-transitory computer-readable medium further includes instructions that, when executed by a processor, cause the processor to determine matched detected objects and unmatched detected objects and apply prior tracking identifiers of the detected objects at the prior time to the matched detected objects. For unmatched detected objects, the computer-readable medium may further include instructions that, when executed by a processor, cause the processor to determine a confidence score for the fused features of the unmatched detected objects and apply new tracking identifiers to the unmatched detected objects based on the confidence score.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described is an object tracking system that is capable of tracking multiple objects. The object tracking system generally includes a feature fusion module, a distance combination module, and a track initialization module. At a high level, the feature fusion module combines features from objects detected within a point cloud and objects detected within a corresponding image to generate fused features. These fused features can include a number of different features extracted from the point cloud and the image to capture the appearance and geometric information of an object.

The distance combination module receives the fused features generated by the feature fusion module at the present time, as well as fused features generated by the feature fusion module at a prior time. Using the fused features at two different moments in time, including a Mahalanobis distance, the distance combination module can generate a learned distance metric that generally represents how similar objects are at the present time with objects of the prior time. This similarity is useful in determining which objects in the present time should be associated with objects in the prior time to be able to track objects properly. Moreover, objects that are detected in the present time may have been previously detected and should be associated with those previous detections. However, objects that are detected in the present time that were not detected before should be initialized as new tracks.

As such, a matching module, which may use a greedy match algorithm, determines which objects in the present time have a match with objects detected in the prior time. Objects that are matched will receive the appropriate tracking number previously used. Unmatched objects are provided to the track initialization module that will apply a new tracking identifier to the unmatched objects. The track initialization module may determine a confidence score to filter out unmatched objects that are false positives. Unmatched objects that have an appropriate confidence score will be provided a new tracking identifier.

Figure 1:
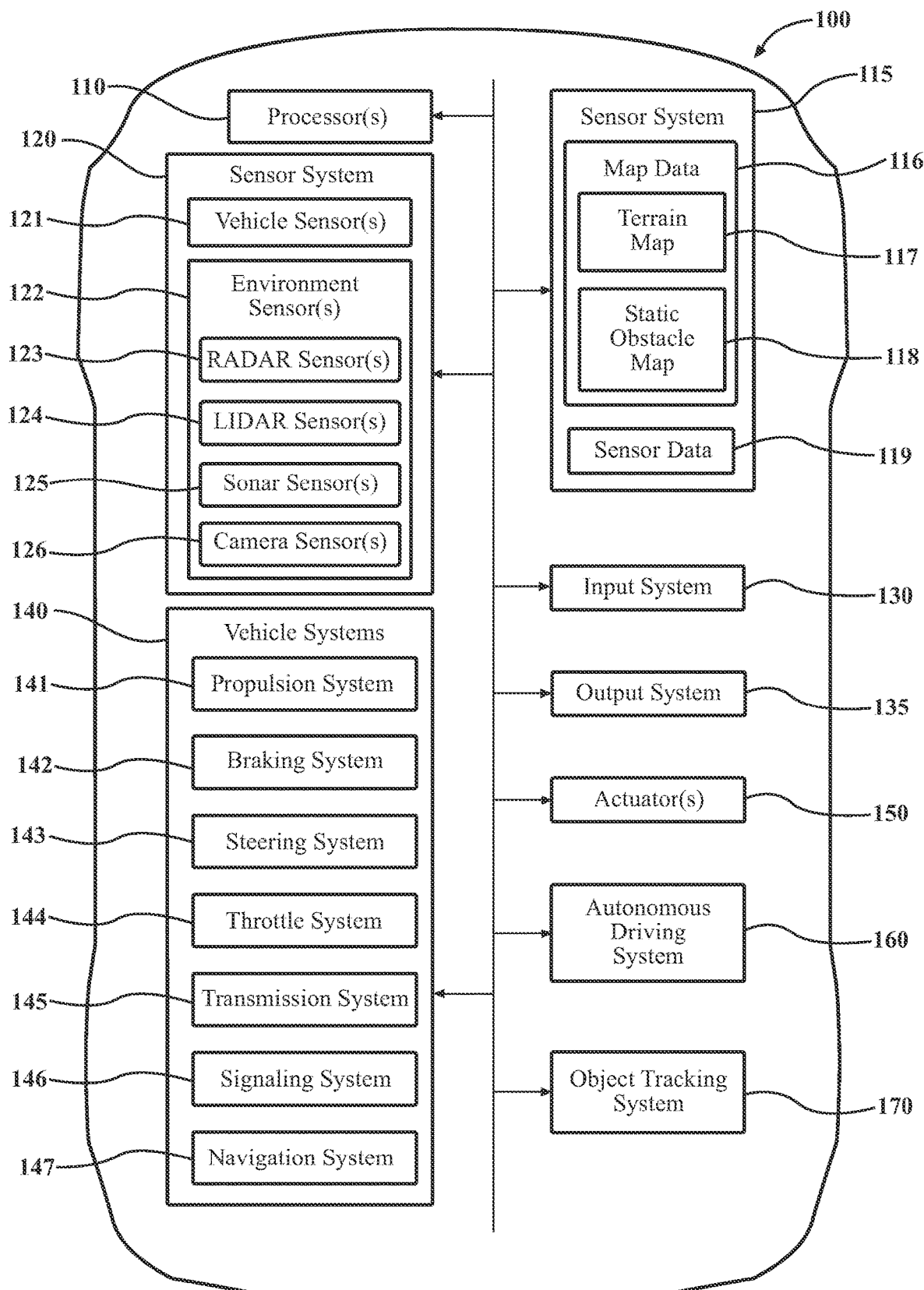
FIG. 1 illustrates a vehicle incorporating an object tracking system.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control as discussed in relation to the autonomous driving system 160.

The vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes an object tracking system 170. The object tracking system 170 may be incorporated within the autonomous driving system 160 or may be separate as shown. The object tracking system 170 can track multiple objects within a scene. Multi-object tracking is an important ability for a vehicle to safely navigate a traffic scene. As explained in greater detail later, the object tracking system 170 is a probabilistic, multi-modal, multi-object tracking system with different trainable modules that provide robust and data-driven tracking results.

Figure 2:
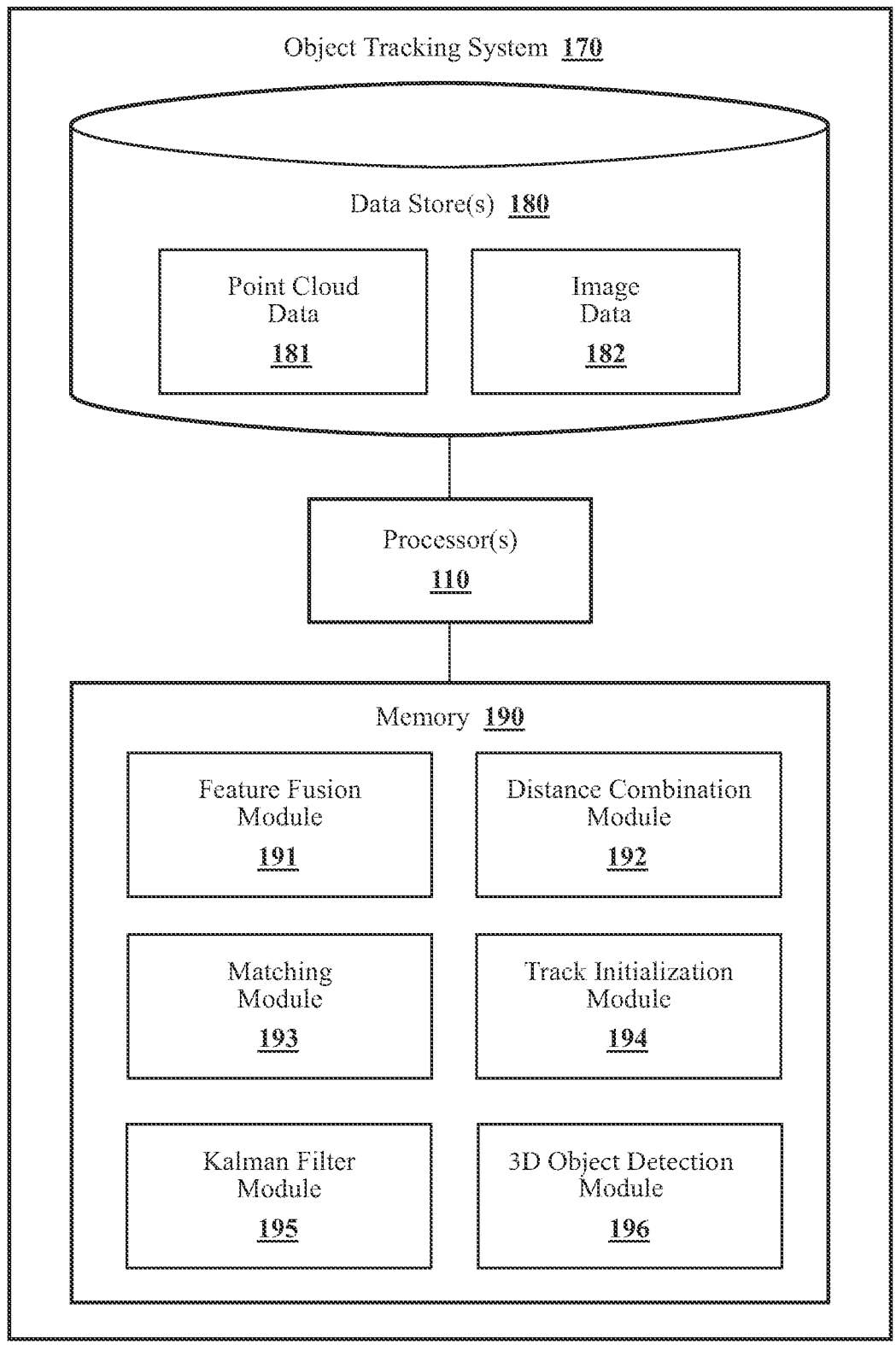
FIG. 2 illustrates a more detailed view of the object tracking system.

With reference to FIG. 2, one embodiment of the object tracking system 170 is further illustrated. As shown, the object tracking system 170 includes one or more processor(s) 110. Accordingly, the processor(s) 110 may be a part of the object tracking system 170, or the object tracking system 170 may access the processor(s) 110 through a data bus or another communication path. In one or more embodiments, the processor(s) 110 is an application-specific integrated circuit that is configured to implement functions associated with a feature fusion module 191, a distance combination module 192, a matching module 193, a track initialization module 194, a Kalman filter module 195, and a 3D object detection module 196.

In general, the processor(s) 110 is an electronic processor such as a microprocessor capable of performing various functions as described herein. In one embodiment, the object tracking system 170 includes a memory 190 that stores the modules 191-196. The memory 190 is a random-access memory (RAM), read-only memory (ROM), a hard disk drive, a flash memory, or other suitable memory for storing the modules 191-196. The modules 191-196 are, for example, computer-readable instructions that, when executed by the processor(s) 110, cause the processor(s) 110 to perform the various functions disclosed herein.

Furthermore, in one embodiment, the object tracking system 170 includes one or more data store(s) 180. The data store(s) 180 is, in one embodiment, an electronic data structure such as a database that is stored in the memory 190 or another memory and that is configured with routines that can be executed by the processor(s) 110 for analyzing stored data, providing stored data, organizing stored data, and so on. Thus, in one embodiment, the data store(s) 180 stores data used and/or generated by the modules 191-196 in executing various functions. In one embodiment, the data store(s) 180 includes point cloud data 181 that may be generated from one or more LIDAR sensor(s) 124 of a scene and image data 182 that may be one or more images of the scene captured by one or more camera sensor(s) 126, both of which are shown in FIG. 1 and will be described later in this disclosure. In some cases, the point cloud data 181 may correspond to the image data 182 such that the point cloud data 181 and image data 182 may be captured at the same or similar times of a scene.

Figure 3:
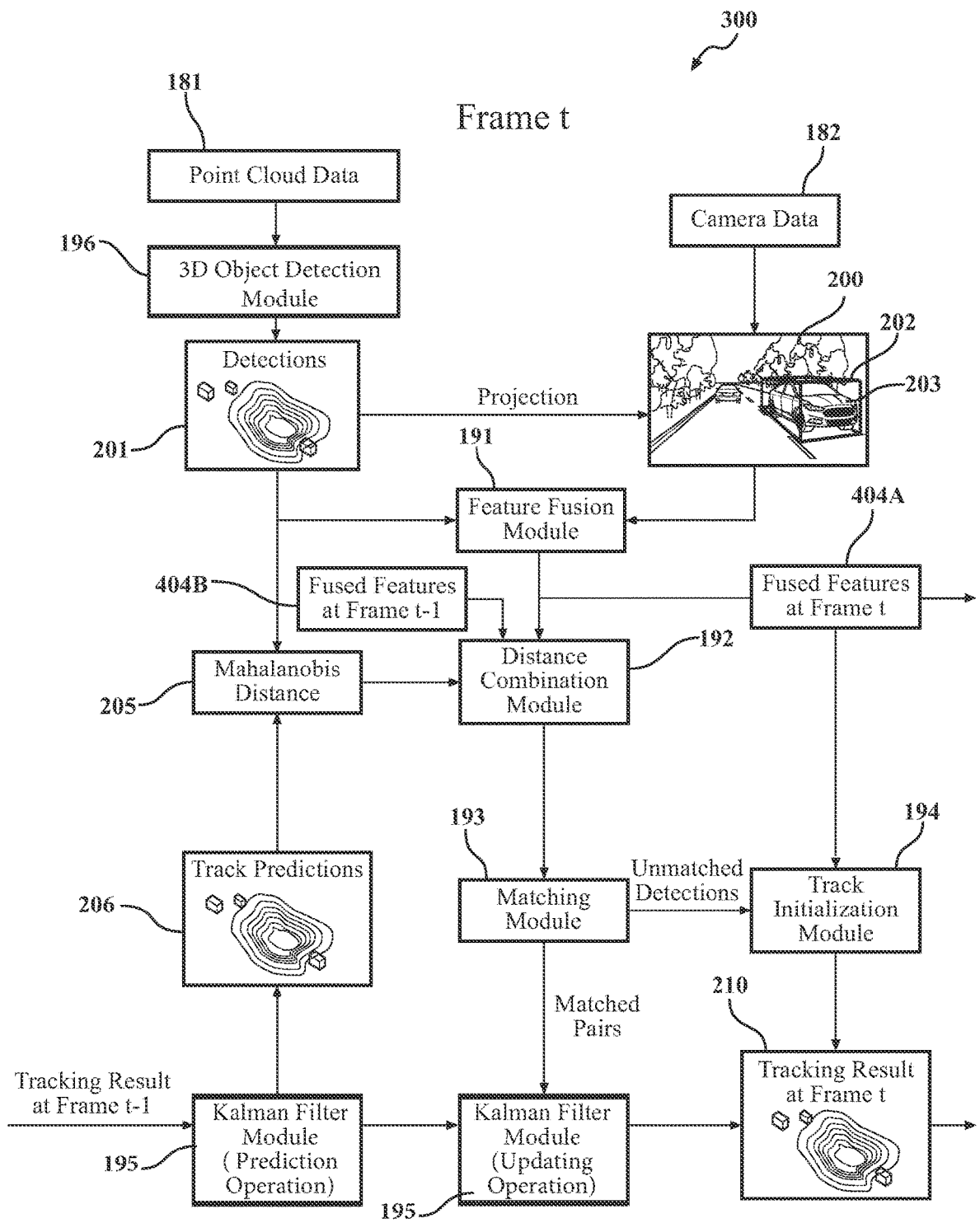
FIG. 3 illustrates a flow chart detailing the flow of information within the various components of the object tracking system.

Accordingly, the feature fusion module 191 generally includes instructions that function to control the processor(s) 110 to merge features of detected objects extracted from a point cloud and a corresponding image to generate fused features for the detected objects. For example, referring to FIG. 3, illustrated is a process flow 300 showing the flow of information within the object tracking system 170. Here, the feature fusion module 191 receives data from two sources. The first source originates with the point cloud data 181, wherein the 3D object detection module 196 outputs the detections 201. These detections 201 may be in the form of bounding boxes that may include information such as predicted positions, orientations, scales of the detected objects. The Kalman filter module 195 may use Kalman filters for object state estimation. Each object's state may be represented by 11 variables:

$$s_t = (x, y, z, a, l, w, h, d_x, d_y, d_z, d_a)^T, \quad (1)$$

where (x, y, z) is the center position of the object's 3D bounding box, a is the angle between the object's facing direction and the x-axis, (l, w, h) represent the length, width, and height of the bounding box, and $(d_x, d_y, d_z, d_a)$ represent the difference of (x, y, z, a) between the current frame taken at the present time and the previous frame taken at a prior time.

The Kalman filter module 195 may cause the processor(s) 110 to model the dynamics of the moving objects using a linear motion model and assume constant linear and angular velocity as well as constant object dimensions, i.e., they do not change during the prediction step. Following the standard Kalman filter formulation, Kalman filter module 195 may define the prediction step as:

$$\hat{\mu}_{t+1} = A\mu_t \quad (2)$$

$$\hat{\Sigma}_{t+1} = A\Sigma_t A^T + Q \quad (3)$$

where $\mu_t$ is the estimated mean of the true state s at time t, and $\hat{\mu}_{t+1}$ is the predicted state mean at time t+1. The matrix A is the state transition matrix of the process model. The matrix $\Sigma_t$ is the state covariance at time t, and $\hat{\Sigma}_{t+1}$ is the predicted state covariance at time t+1. The matrix Q is the process model noise covariance.

In one example, the 3D object detection module 196 may use any 3D object detector to provide the observations to the Kalman Filter. The per-frame 3D object detection results include a set of detections 201, with each detection of the detections 201 being in the form of a bounding box represented by 9 variables:

$$o_t = (x, y, z, a, l, w, h, d_x, d_y)^T, \quad (4)$$

where (x, y, z; a, l, w, h) are the bounding box's center position, orientation, and scale, similar to the definitions in Equation 1. The remaining two variables $(d_x, d_y)$ represent the difference of (x, y) between the current frame and the previous frame. These two values can be derived by multiplying the detector's estimated center velocity with the time duration between two consecutive frames.

The Kalman filter module 195 may use linear observation model H with additive Gaussian noise that has zero mean and noise covariance R. Using this observation model and the predicted object state $\hat{\mu}_{t+1}$, the Kalman filter module 195 may cause the processor(s) 110 to predict the next measurement $\hat{o}_{t+1}$ and innovation covariance $S_{t+1}$ that represents the uncertainty of the predicted object detection:

$$\hat{o}_{t+1} = H\hat{\mu}_{t+1} \quad (5)$$

$$S_{t+1} = H\hat{\Sigma}_{t+1}H^T + R \quad (6)$$

The noise covariance matrices Q and R of the process model and the observation model may be estimated from the statistics of the training set data.

Regarding the image data 182, the image data 182 includes an image 200 of an object 202 bounded by a projected 2D bounding box 203. The projected 2D bounding box 203 is generated by projecting the 3D bounding box of the detections 201 to the image plane of the image 200.

This feature fusion module 191 is designed to fuse the features from the image 200 and the detections 201 per detection in the keyframes. The fused features will be used as input to the distance combination module 192 and the track initialization module 194.

Figure 4:
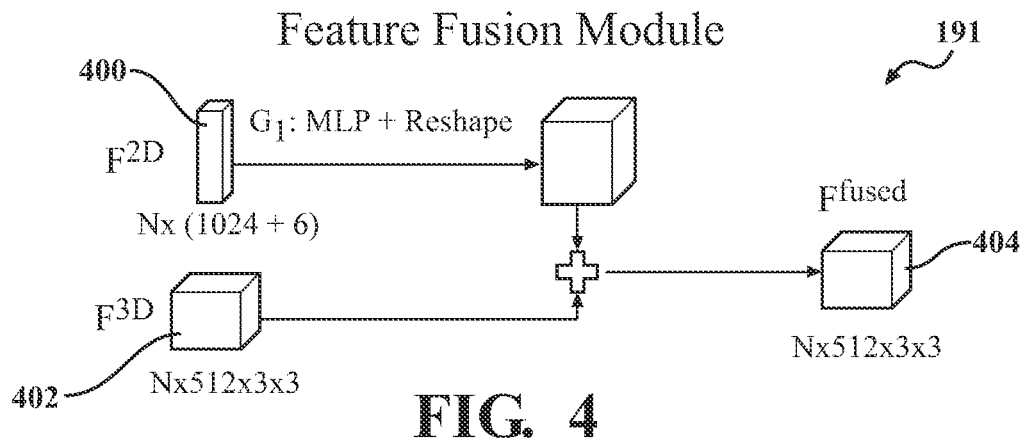
FIG. 4 illustrates a more detailed view of a feature fusion module of the object tracking system.

Referring to FIG. 4, which illustrates the feature fusion module 191 in more detail, for each detection, feature fusion module 191 maps its 2D position (x, y) from the world coordinate system to the 2D location ($x_{map}$, $y_{map}$) in the intermediate feature map coordinate system of the 3D object detector. From this intermediate feature map, the feature fusion module 191 extracts a 512×3×3 LiDAR point cloud feature 402. Instead of only extracting a single feature vector located at ($x_{map}$, $y_{map}$) in the feature map, the feature fusion module 191 causes the processor(s) 110 to extract all the feature vectors inside the associated (3×3) xy region centered at ($x_{map}$, $y_{map}$) to utilize more context information provided by the object detector.

The feature fusion module 191 causes the processor(s) 110 to project the 3D detections 201 to the camera image plane of the image 200 and extract the corresponding 2D image feature 400 from a pre-trained Mask R-CNN. For each projected 2D bounding box 203, the feature fusion module 191 causes the processor(s) 110 to extract a 1024-dimensional vector 400 from the RoIAlign feature of the projected 2D bounding box 203 and concatenate it with a 6D one-hot vector indicating to which camera plane (out of 6 in the sensor sweep) the object projects.

Next, the feature fusion module 191 causes the processor(s) 110 to combine the two feature vectors 400 and 402 to generate the fused features 404 through a multi-layer-perceptron (MLP), and a reshape operation:

$$F^{fused}=G_1(F^{2D})+F^{3D} \quad (7)$$

where $F^{fused} \in R^{N \times 512 \times 3 \times 3}$ is the fused feature of N detections, $G_1(\bullet)$ denotes the MLP and the reshape operation depicted in FIG. 4.

Figure 5:
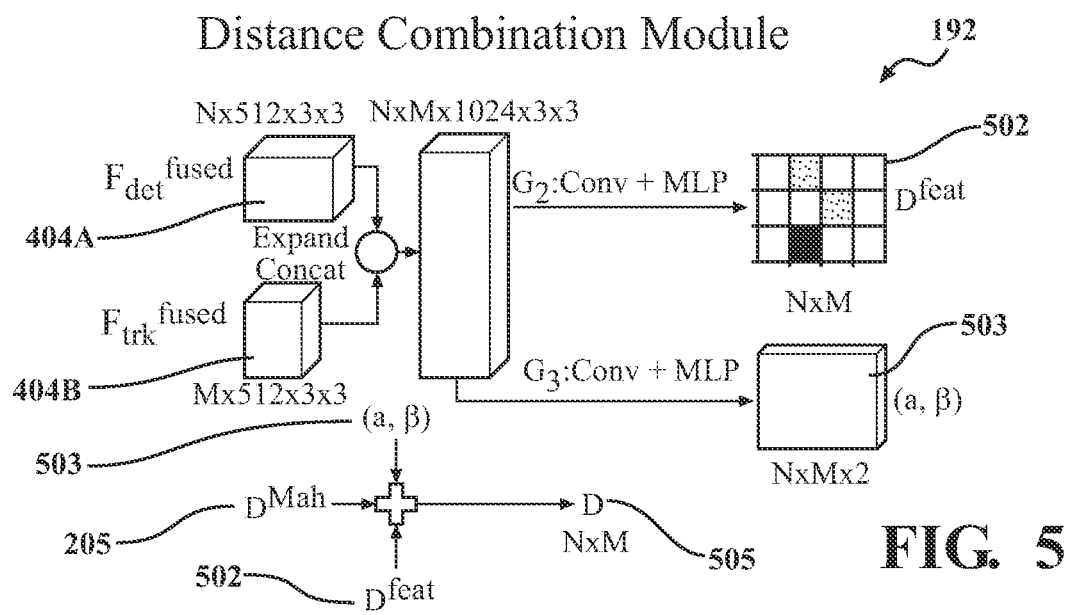
FIG. 5 illustrates a more detailed view of the distance combination module of the object tracking system.

As to the distance combination module 192, reference is made to FIG. 5, which illustrates the distance combination module 192 in greater detail. The distance combination module 192 includes instructions that, when executed by the processor(s) 110, cause the processor(s) 110 to generate a learned distance metric 505 for the detected objects using the fused features 404A at a current time, fused features 404B at a prior time, and Mahalanobis distances 205. The Mahalanobis distances 205 indicate distances between positions, orientations, and scales of detected objects at the current time, represented by the detections 201 and predicted positions, orientations, and scales of the detected objects determined at the prior time represented by the detections 206, shown in FIG. 3.

Essentially, the distance combination module 192 causes the processor(s) 110 to determine learned distance metric 505 for data association between a set of tracks and new detections. The learned distance metric 505 combines information from state estimates as well as appearances, such as the color of the detected object and geometry features.

FIG. 5 illustrates a more detailed view of the distance combination module 192. In one example, the distance combination module 192 causes the processor(s) 110 to design a linear combination of the Mahalanobis and deep feature distance:

$$D=D^{Mah}+\alpha(D^{feat}-(0.5+\beta)), \quad (8)$$

where $D^{Mah}$ 205 denotes the Mahalanobis distance matrix where each element contains the distance between each detection and predicted state per track; $D^{feat}$ 502 denotes the feature distance matrix whose elements measure the feature dissimilarity between each detection and each track, and ($\alpha$, $\beta$) are coefficient matrices 503.

Each element of $D^{Mah}$ 205 is computed by:

$$D_{(n,m)}^{Mah}=\sqrt{(o_n-H\hat{\mu}_m)^T S^{-1}(o_n-H\hat{\mu}_m)}, \quad (9)$$

where $o_n$ is the detection n, defined in Equation 4, H is the linear observation model, ($\hat{\mu}_m$) is the mth track predicted state mean and S is the innovation covariance matrix as defined in Equation 6.

The distance combination module 192 may utilize a neural network to estimate the deep feature distance 502 and the coefficient matrices 503 given the fused features of the N detections and M tracks ($F_{det}^{fused}$, $F_{trk}^{fused}$). The network learns an N×M distance map from fused features of the N detections and M tracks ($F_{det}^{fused}$, $F_{trk}^{fused}$):

$$D^{feat}=G_2(F_{det}^{fused}, F_{trk}^{fused}) \quad (10)$$

where $G_2(\bullet)$ denotes the convolutional operators in FIG. 5. The feature distance learning is supervised by treating it as a binary classification problem. If a track and a detection match to the same ground-truth object, that track-detection pair is treated as a positive training sample, otherwise negative one. The network is trained with Binary Cross Entropy Loss:

$$L^{dist}=BCE(D^{feat},K), \quad (11)$$

where K is the matching indicator matrix in which 0 indicates a matched feature pair coming from the same object and 1 indicates an unmatched feature pair. Since there is no ground-truth annotation for each track-detection pair, a pair is treated as matched if the tracking box in the previous frame and the detection box in the current frame match to the same nearby ground-truth object. Otherwise, the pair is treated as unmatched.

The distance combination module 192 learns the coefficient matrices ($\alpha$, $\beta$) 503 to adjust the final learned distance metric 505 based on how important each deep feature distance is.

$$(\alpha,\beta)=G_3(F_{det}^{fused},F_{trk}^{fused}), \quad (12)$$

where $G_3(\bullet)$ denotes the convolutional operators in FIG. 5.

This module may be trained with a combination of max-margin and contrastive losses. For a pair of a positive sample i and a negative sample j, its max-margin loss may be defined as follows:

$$L_{i,j}^{contr}=\max(0,C^{contr}-(d_i-d_j)), \quad (13)$$

where $C^{contr}$ is a constant margin, $d_i$ is the combined distance of positive sample i and $d_j$, is the combined distance of negative sample j, as can be found in distance matrix D in Equation 8. The overall contrastive loss is given as follows:

$$L^{contr} = \frac{1}{|Pos||Neg|} \sum_{i \in Pos, j \in Neg} L_{i,j}^{contr}, \quad (14)$$

where Pos denotes the set of positive track-detection pairs and Neg denotes the set of negative track-detection pairs. This loss function design encourages the neural network 500 to learn to generate a distance $d_i$ for every positive track detection sample to be smaller than the distance $d_j$ of any negative sample by adjusting the elements of $\alpha$ and $\beta$.

To also use the learned combined distance D to reject unmatched outliers at inference time, two other max-margin losses are defined for the positive sample set and negative sample set as follows:

$$L^{pos} = \frac{1}{|Pos|} \sum_{i \in Pos} \max(0, C^{pos} - (T - d_i)), \quad (15)$$

$$L^{neg} = \frac{1}{|Neg|} \sum_{j \in Neg} \max(0, C^{neg} - (d_j - T)), \quad (16)$$

where $C^{pos}$ and $C^{neg}$ denote constant margins and T is the constant threshold used to reject unmatched outliers at inference time. This loss function design encourages the neural network 500 to generate a distance $d_i$ smaller than the threshold T for any positive sample and a distance $d_j$ larger than T for any negative sample.

The overall training loss of this neural network is defined as follows:

$$L^{coef} = L^{contr} + L^{pos} + L^{neg}, \quad (17)$$

At test time, once the combined distance is calculated, data association is conducted by the matching module 193 using a greedy matching algorithm. Moreover, the matching module 193 includes instructions that, when executed by the processor(s) 110, cause the processor(s) 110 to apply prior tracking identifiers of the detected objects at the prior time to the matched detected objects. In one example, T=11, $C^{contr}=6$, roughly half of T, and $C^{pos}=C^{neg}=3$ (half of $C^{contr}$).

The track initialization module 194 includes instructions that, when executed by the processor(s) 110, cause the processor(s) 110 to determine a confidence score for the fused features of the unmatched detected objects and apply new tracking identifiers to the unmatched detected objects based on the confidence score. Moreover, the track initialization module 194 causes the processor(s) 110 to treat the track initialization task as a simple binary classification problem and solve it with a data-driven approach.

Figure 6:
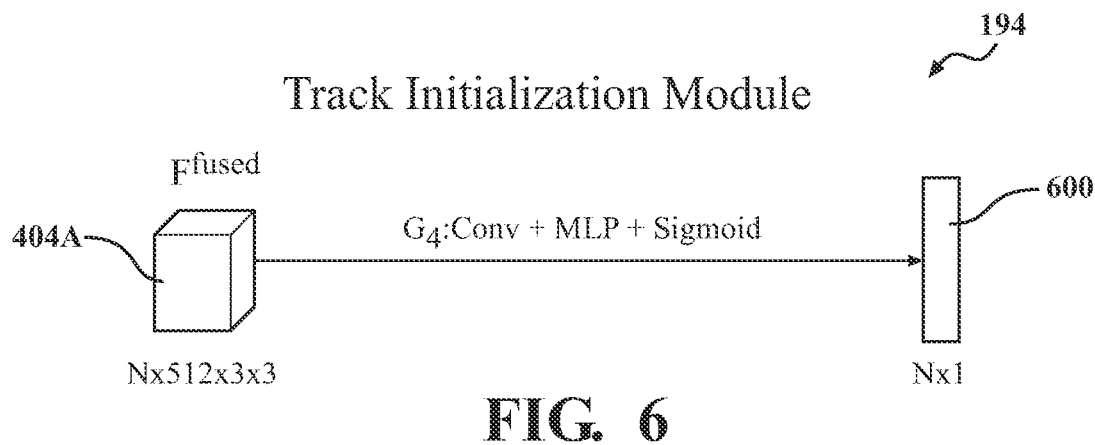
FIG. 6 illustrates a more detailed view of the track initialization module of the object detection system.

In one example, the track initialization module 194 causes the processor(s) 110 to take the fused features 404A ($F^{fused}$) of unmatched detections as input and generate an output confidence score P on whether a new track should be initialized or not:

$$P = G_4(F^{fused}), \quad (18)$$

where $G_4$ denotes the convolutional operators depicted in FIG. 6. $G_4$ is trained as a binary classifier using the Cross-Entropy loss:

$$L^{init} = BCE(P, P^{target}), \quad (19)$$

where $P_n^{target}=1$ if there is a ground-truth object close to detection n, otherwise $P_n^{target}=0$. At inference time, an unmatched detection may be initialed with a new tracker if $P_n$ is larger than 0.5.

The object tracking system 170 provides a robust and data-driven tracking results. By effectively fusing both to the and 3D input, the object tracking system 170 improves the performance of tracking multiple objects and decreases the number of false-positive tracks, which may be useful for downstream processes, such as vehicle motion planning and other decision-making. In the end, the system 170 outputs tracking results 210 that includes bounding boxes for each detection as well as appropriate tracking identifiers for each detection.

Figure 7A:
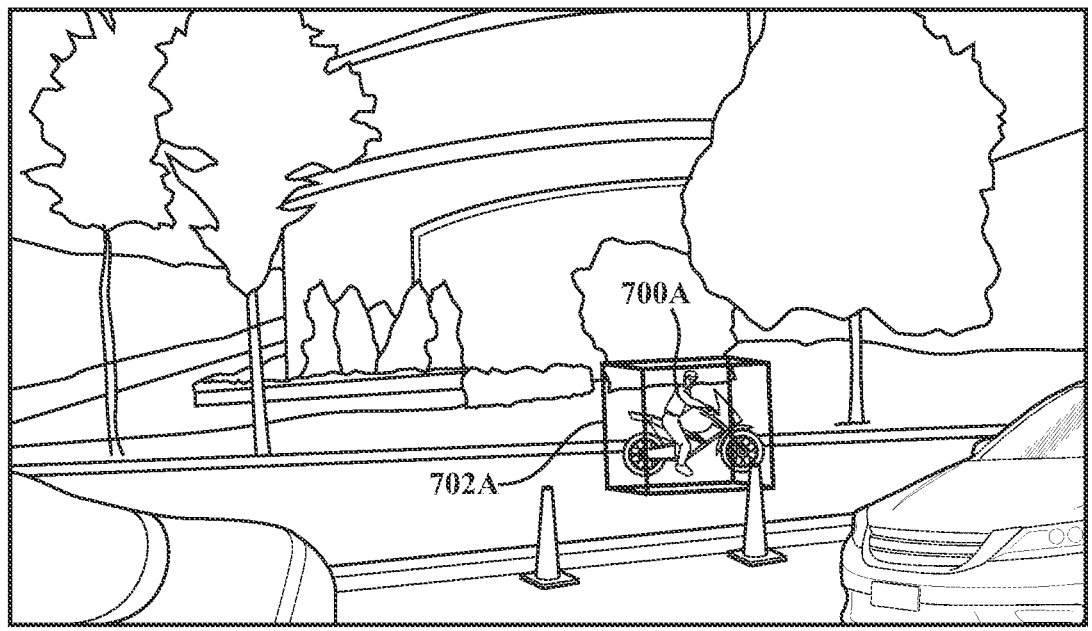
FIGS. 7A and 7B illustrate one example of the tracking of an object within a scene at two different frames by the object tracking system.
Figure 7B:
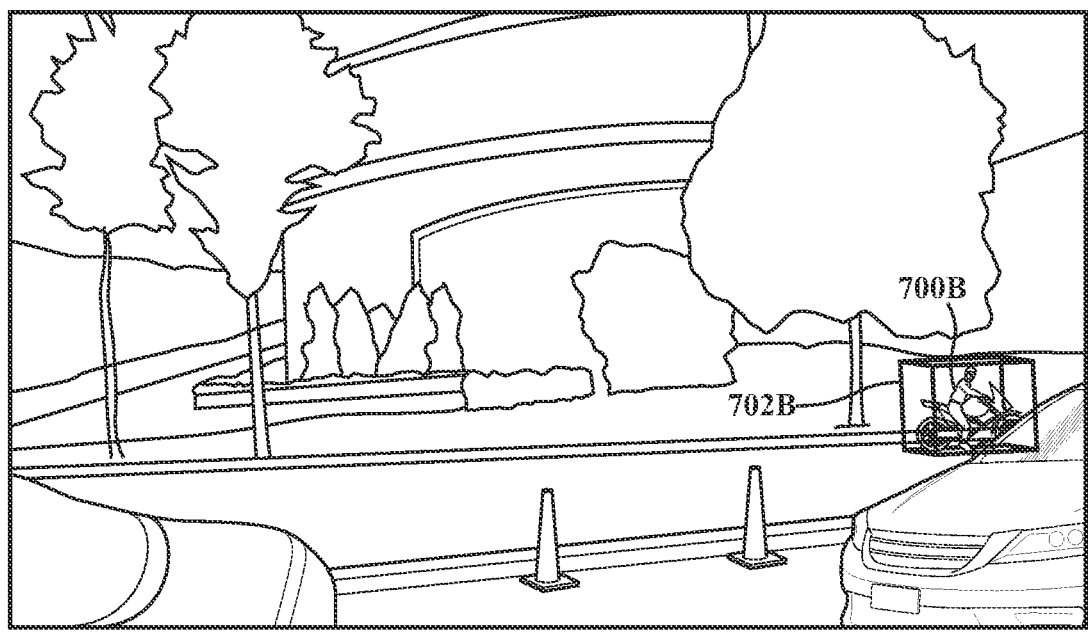
Figure 8A:
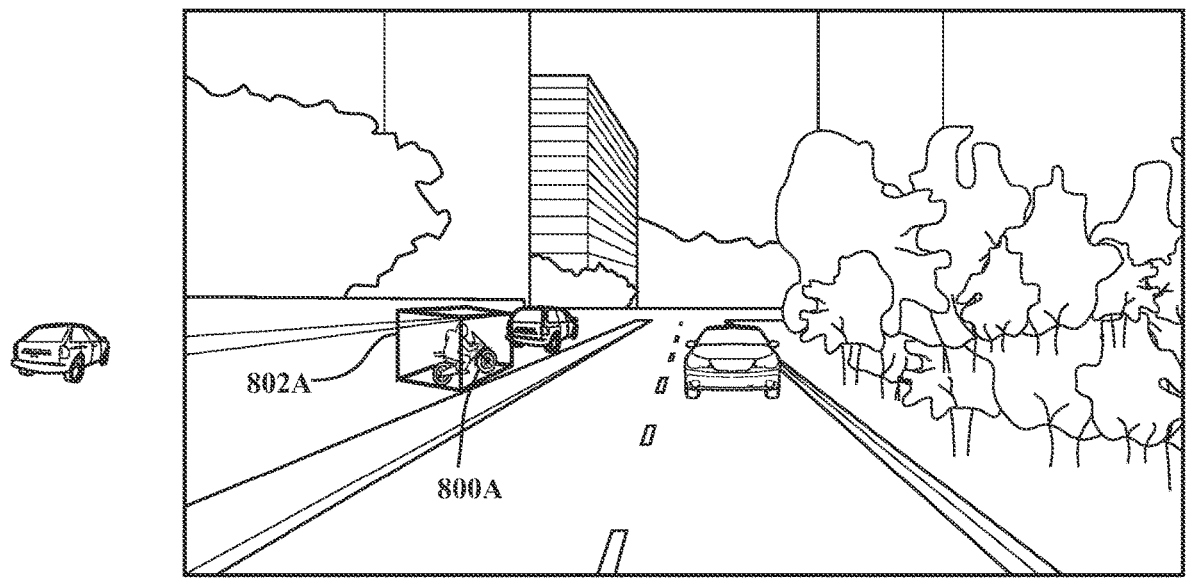
FIGS. 8A and 8B illustrate another example of the tracking of an object within a scene at two different frames by the object tracking system.
Figure 8B:
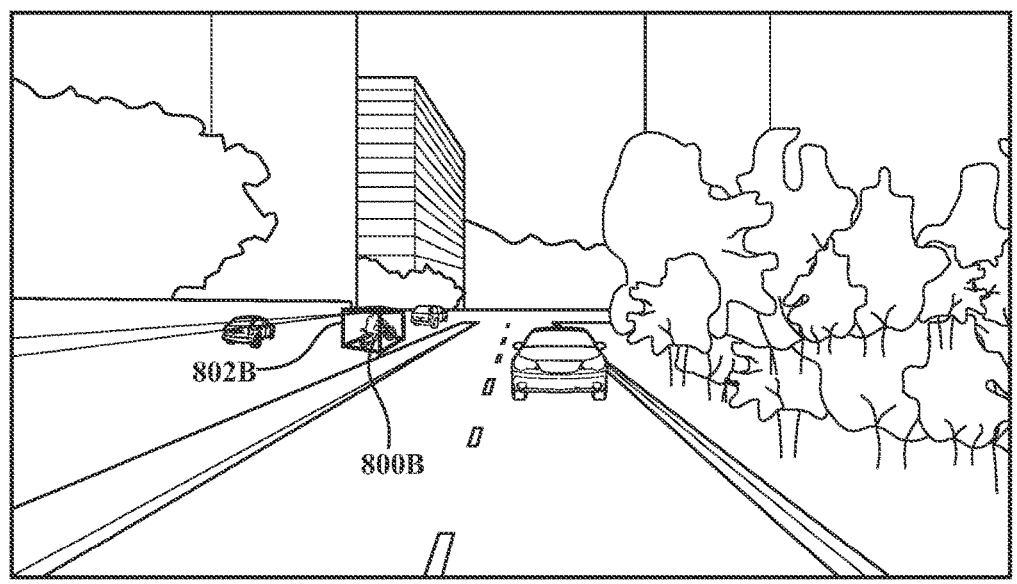

To understand the output of the object tracking system 170 better, reference is made to FIGS. 7A, 7B, 8A, and 8B. These figures illustrate tracking visualization results of motorcycles projected to camera images. FIGS. 7A and 8A have consecutive frames shown in FIGS. 7B and 8B, respectively. FIGS. 7A and 7B illustrate one sequence, while FIGS. 8A and 8B illustrate another sequence.

Regarding FIGS. 7A and 7B these figures illustrate an object 700A and 700B in the form of a motorcycle within a scene. In addition, the objects 700A and 700B are identified with bounding boxes 702A and 702B, respectively. Similarly, regarding FIGS. 8A and 8B these figures illustrate an object 800A and 800B in the form of a motorcycle within a scene. In addition, the objects 800A and 800B are identified with bounding boxes 802A and 802B, respectively.

The object tracking system 170 accurately tracks the objects 700A and 800A in both sequences. In the first sequence shown in FIGS. 7A and 7B, the distance combination module 192 caused the processor(s) 110 to predict a fairly large positive value ($\alpha$=2.594) for the tracked object 700A, 700B, indicating a more reliable feature distance where the corresponding objects are large and clearly captured in the 2D images.

In the second sequence shown in FIGS. 8A and 8B, the distance combination module 192 caused the processor(s) 110 to predict a smaller positive value ($\alpha$=1.802) for the tracked object 800A, 800B, as the tracked object 800A, 800B is smaller and more blurred in the captured 2D images. Additionally, the track initialization module 194 causes the processor(s) 110 to correctly determine not to initialized new tracks for any false positive detections.

Figure 9:
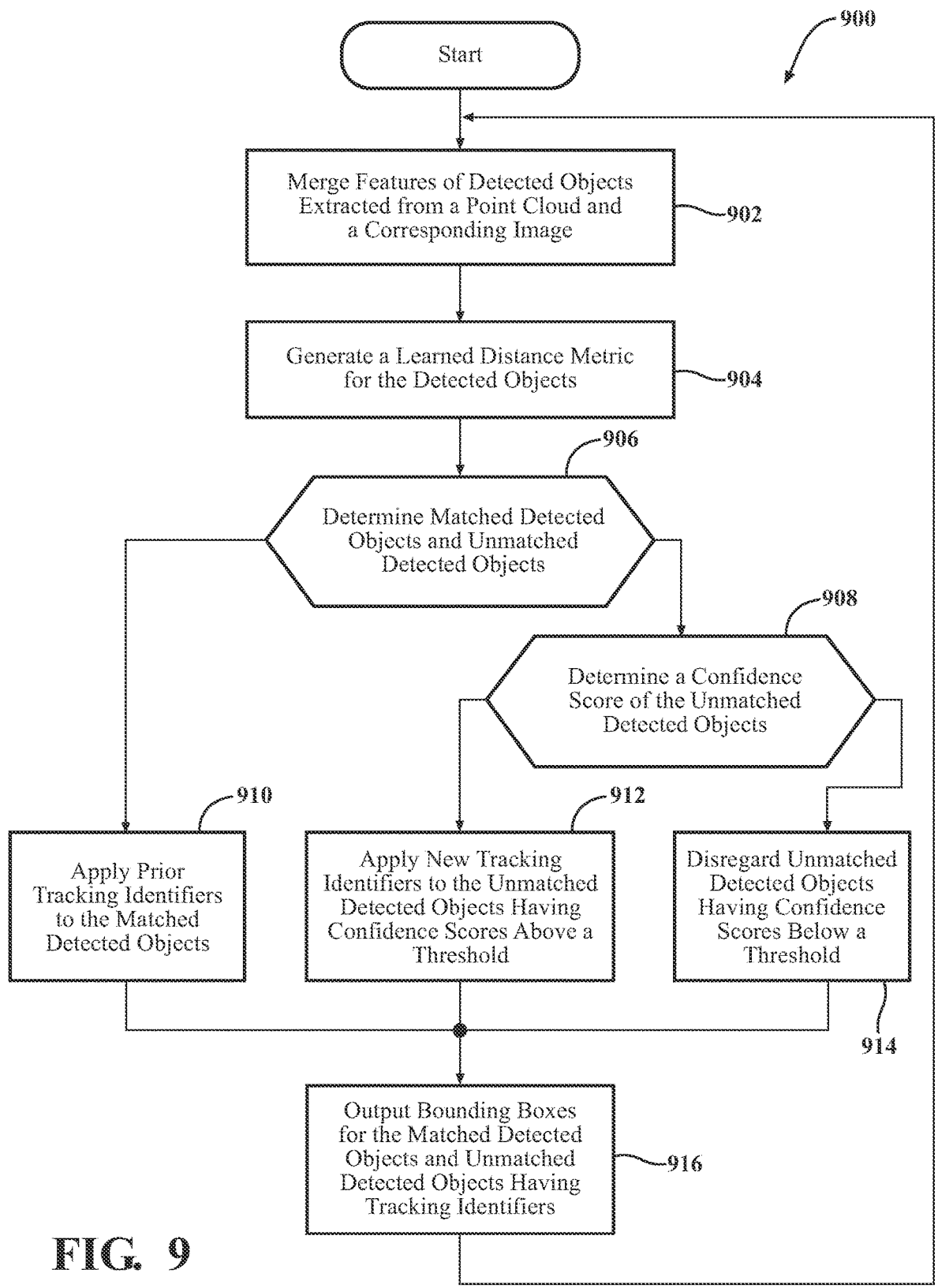
FIG. 9 illustrates a method for tracking an object that may be executed by the object tracking system.

Referring to FIG. 9, a method 900 for tracking multiple objects is shown. The method 900 will be described from the viewpoint of the vehicle 100 of FIG. 1 and the object tracking system 170 of FIG. 2. However, it should be understood that this is just one example of implementing the method 900. While method 900 is discussed in combination with the object tracking system 170, it should be appreciated that the method 900 is not limited to being implemented within the object tracking system 170 but is instead one example of a system that may implement the method 900.

In step 902, the feature fusion module 191 causes the processor(s) 110 to merge features of detected objects extracted from a point cloud from the point cloud data 181 and a corresponding image from the image data 182 to generate fused features for the detected objects. As explained previously in the paragraphs above, the feature fusion module 191 is designed to fuse the features from 2D camera images of the image data 182 and point cloud data 181 per detection in the keyframes. The fused features will be used as input to the distance combination module 192 and the track initialization module 194.

In step 904, distance combination module 192 causes the processor(s) 110 to determine learned distance metric 505 for data association between a set of tracks and new detections. The learned distance metric 505 combines information from state estimates as well as appearances, such as the color of the detected object and geometry features. Moreover, as previously described, distance combination module 192 causes the processor(s) 110 to the fused features at a current time, fused features at a prior time, and Mahalanobis distances indicating distances between positions, orientations, and scales of detected objects at the current time and predicted positions, orientations, and scales of the detected objects determined at the prior time.

In step 906, the matching module 193 causes the processor(s) 110 to determine matched detected objects and unmatched detected objects, wherein the matched detected objects are detected objects at the current time that have been matched with detected objects at the prior time based on the learned distance metric. For the matched objects, the method 900 proceeds to step 910, wherein the matching module 193 causes the processor(s) 110 to apply prior tracking identifiers of the detected objects at the prior time to the matched detected objects.

For the unmatched objects, the method proceeds to step 908, where the track initialization module causes the processor(s) 110 to determine a confidence score for the fused features of the unmatched detected objects. As stated previously, the track initialization module 194 causes the processor(s) 110 to take the fused features 404A ($F^{fused}$) of unmatched detections as input and generate an output confidence score P on whether a new track should be initialized.

If the confidence score for an unmatched object is above a certain threshold, the track initialization module causes the processor(s) 110 to apply a new tracking identifier to the unmatched detected object, as shown in step 912. Otherwise, as shown in step 914, unmatched detected objects with confidence scores below a threshold are discarded as false positives.

In step 916, the Kalman filter module 195 causes the processor(s) 110 to output bounding boxes for the matched detected objects and the unmatched detected objects that have been provided tracking identifiers. In one example, the Kalman filter module 195 causes the processor(s) 110 to predict positions, orientations, scales of the detected objects based on positions, orientations, scales, angular velocities, and linear velocities of the matched and unmatched detected objects. Of course, unmatched detected objects discarded in step 914 are not provided bounding boxes or any other additional information, as they have been deemed false positives. After step 916, the method 900 may either end or may begin again in return to step 902.

FIG. 1 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route.

As stated before, the vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data store(s) 115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data store(s) 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensor(s) 124 of the sensor system 120.

In some instances, at least a portion of the map data 116 and/or the sensor data 119 can be located in one or more data store(s) 115 located onboard the vehicle 100. Alternatively, or in addition, at least a portion of the map data 116 and/or the sensor data 119 can be located in one or more data store(s) 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensor(s) 121. However, it will be understood that the embodiments are not limited to the particular sensors described.

As an example, in one or more arrangements, the sensor system 120 can include one or more radar sensors 123, one or more LIDAR sensor(s) 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement, or groups that enable information/data to be entered into a machine. The input system 130 can receive an input from a vehicle passenger (e.g., a driver or a passenger). The vehicle 100 can include an output system 135. An "output system" includes any device, component, or arrangement, or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the object tracking system 170, and/or the autonomous driving system 160 can be operatively connected to communicate with the vehicle systems 140 and/or individual components thereof. For example, returning to FIG. 1, the processor(s) 110 and/or the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140 and, thus, may be partially or fully autonomous.

The processor(s) 110 and/or the autonomous driving system 160 can be operatively connected to communicate with the vehicle systems 140 and/or individual components thereof. For example, returning to FIG. 1, the processor(s) 110, the object tracking system 170, and/or the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140.

The processor(s) 110 and/or the autonomous driving system 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving system 160 can control the direction and/or speed of the vehicle 100. The processor(s) 110 and/or the autonomous driving system 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either directly or indirectly.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor (s) 110 and/or the autonomous driving system 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor (s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine the position and velocity of the vehicle 100. The autonomous driving system 160 can determine the location of obstacles, obstacles, or other environmental features, including traffic signs, trees, shrubs, neighboring vehicles, pedestrians, etc.

The autonomous driving system 160 can be configured to receive and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 either independently or in combination with the object tracking system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source.

"Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either directly or indirectly. The autonomous driving system 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

According to various embodiments, the flowcharts and block diagrams in the figures illustrate the architecture, functionality, and operation of possible implementations of systems, methods, and computer program products. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the terms "a" and "an" are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for tracking detected objects comprising:
   a processor;
   a memory in communication with the processor, the memory having a feature fusion module, a distance combination module, a matching module, and a track initialization module;
   the feature fusion module includes instructions that, when executed by the processor, cause the processor to merge features of detected objects extracted from a point cloud and a corresponding image to generate fused features for the detected objects;
   the distance combination module includes instructions that, when executed by the processor, cause the processor to generate a learned distance metric for the detected objects using the fused features at a current time, fused features at a prior time, and Mahalanobis distances indicating distances between positions, orientations, and scales of detected objects at the current time and predicted positions, orientations, and scales of the detected objects determined at the prior time;
   the matching module includes instructions that, when executed by the processor, cause the processor to determine matched detected objects and unmatched detected objects, wherein the matched detected objects are detected objects at the current time that have been matched with detected objects at the prior time based on the learned distance metric;
   the matching module includes instructions that, when executed by the processor, cause the processor to apply prior tracking identifiers of the detected objects at the prior time to the matched detected objects; and
   the track initialization module includes instructions that, when executed by the processor, cause the processor to determine a confidence score for the fused features of the unmatched detected objects and apply new tracking identifiers to the unmatched detected objects based on the confidence score.

2. The system of claim 1, wherein the learned distance metric represents a similarity between the detected objects at the current time and the detected objects at the prior time.

3. The system of claim 1, wherein the memory further includes a Kalman filter module having instructions that, when executed by the processor, cause the processor to:
   output bounding boxes for the matched detected objects, the bounding boxes for the matched detected objects include positions, orientations, scales, and prior tracking identifiers; and
   output bounding boxes for the unmatched detected objects that have been assigned new tracking identifiers, the bounding boxes for the unmatched detected objects including positions, orientations, scales, and new tracking identifiers.

4. The system of claim 3, wherein the Kalman filter module further includes instructions that, when executed by the processor, cause the processor to determine predicted positions, orientations, scales of the detected objects based on positions, orientations, scales, angular velocities, and linear velocities of the detected objects.

5. The system of claim 1, wherein the corresponding image includes bounding boxes for the detected objects projected from three-dimensional bounding boxes generated from the point cloud.

6. The system of claim 1, wherein at least one of the feature fusion module, the distance combination module, and the track initialization module include one or more neural networks.

7. The system of claim 1, wherein the fused features for the detected objects includes color information of the detected objects extracted from the corresponding image.

8. A method for tracking detected objects comprising the steps of:
merging features of detected objects extracted from a point cloud and a corresponding image to generate fused features for the detected objects;
generating a learned distance metric for the detected objects using the fused features at a current time, fused features at a prior time, and Mahalanobis distances indicating distances between positions, orientations, and scales of detected objects at the current time and predicted positions, orientations, and scales of the detected objects determined at the prior time;
determining matched detected objects and unmatched detected objects, wherein the matched detected objects are detected objects at the current time that have been matched with detected objects at the prior time based on the learned distance metric; and
applying prior tracking identifiers of the detected objects at the prior time to the matched detected objects.

9. The method of claim 8, further comprising the step of outputting bounding boxes for the matched detected objects, the bounding boxes for the matched detected objects include positions, orientations, scales, and prior tracking identifiers.

10. The method of claim 8, further comprising the step of determining predicted positions, orientations, scales of the detected objects based on positions, orientations, scales, angular velocities, and linear velocities of the detected objects.

11. The method of claim 8, further comprising the steps of:
determining a confidence score for the fused features of the unmatched detected objects; and
applying new tracking identifiers to the unmatched detected objects based on the confidence score.

12. The method of claim 11, further comprising the step of outputting bounding boxes for the unmatched detected objects that have been assigned new tracking identifiers, the bounding boxes for the unmatched detected objects including positions, orientations, scales, and new tracking identifiers.

13. The method of claim 8, wherein the learned distance metric represents a similarity between the detected objects at the current time and the detected objects at the prior time.

14. The method of claim 8, wherein the corresponding image includes bounding boxes for the detected objects projected from three-dimensional bounding boxes generated from the point cloud.

15. The method of claim 8, wherein the fused features for the detected objects includes color information of the detected objects extracted from the corresponding image.

16. A non-transitory computer-readable medium having instructions that, when executed by a processor, cause the processor to:
merge features of detected objects extracted from a point cloud and a corresponding image to generate fused features for the detected objects;
generate a learned distance metric for the detected objects using the fused features at a current time, fused features at a prior time, and Mahalanobis distances indicating distances between positions, orientations, and scales of detected objects at the current time and predicted positions, orientations, and scales of the detected objects determined at the prior time;
determine matched detected objects and unmatched detected objects, wherein the matched detected objects are detected objects at the current time that have been matched with detected objects at the prior time based on the learned distance metric; and
apply prior tracking identifiers of the detected objects at the prior time to the matched detected objects.

17. The non-transitory computer-readable medium of claim 16, further having instructions that, when executed by the processor, cause the processor to output bounding boxes for the matched detected objects, the bounding boxes for the matched detected objects include positions, orientations, scales, and prior tracking identifiers.

18. The non-transitory computer-readable medium of claim 16, further having instructions that, when executed by the processor, cause the processor to:
determine a confidence score for the fused features of the unmatched detected objects; and
apply new tracking identifiers to the unmatched detected objects based on the confidence score; and
output bounding boxes for the unmatched detected objects that have been assigned new tracking identifiers, the bounding boxes for the unmatched detected objects including positions, orientations, scales, and new tracking identifiers.

19. The non-transitory computer-readable medium of claim 16, wherein the learned distance metric represents a similarity between the detected objects at the current time and the detected objects at the prior time.

20. The non-transitory computer-readable medium of claim 16, wherein the fused features for the detected objects includes color information of the detected objects extracted from the corresponding image.

* * * * *